United States Patent
Lee et al.

(10) Patent No.: US 11,395,152 B2
(45) Date of Patent: Jul. 19, 2022

(54) METHOD AND APPARATUS FOR COMMUNICATION ENVIRONMENT ANALYSIS AND NETWORK DESIGN CONSIDERING RADIO WAVE INCOMING UNIT OF STRUCTURE

(71) Applicant: Samsung Electronics Co., Ltd., Suwon-si (KR)

(72) Inventors: Soon Young Lee, Suwon-si (KR); Sungbum Park, Suwon-si (KR); Min Sung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 16/765,313

(22) PCT Filed: Nov. 16, 2018

(86) PCT No.: PCT/KR2018/014118
§ 371 (c)(1),
(2) Date: May 19, 2020

(87) PCT Pub. No.: WO2019/124753
PCT Pub. Date: Jun. 27, 2019

(65) Prior Publication Data
US 2021/0409966 A1    Dec. 30, 2021

(30) Foreign Application Priority Data
Dec. 18, 2017    (KR) .......................... 10-2017-0174284

(51) Int. Cl.
*H04W 16/22*    (2009.01)

(52) U.S. Cl.
CPC ................................. *H04W 16/225* (2013.01)

(58) Field of Classification Search
CPC .......................... H04W 4/33; H04W 16/18–225
See application file for complete search history.

(56) References Cited

U.S. PATENT DOCUMENTS 8,897,383 B1 * 11/2014 Marupaduga ......... H04W 16/20
  375/267
2004/0259554 A1 12/2004 Rappaport et al.
(Continued)

FOREIGN PATENT DOCUMENTS

CN    103609044 A    2/2014
CN    104363616 A    2/2015
(Continued)

OTHER PUBLICATIONS

Pavel Valtr et al., "Measurement of window blind attenuation at 5-50 GHz", Antennas and Propagation (EUCAP), 2013 7th European Conference on, IEEE, April, 8, 2013, pp. 3790-3793, XP032430783.

(Continued)

*Primary Examiner* — Ronald Eisner
(74) *Attorney, Agent, or Firm* — Jefferson IP Law, LLP

(57) ABSTRACT

A method for identifying a wireless signal transmission characteristic in a wireless communication system according to one embodiment of the present specification includes the steps for: identifying a signal transmission location; identifying a structure; identifying at least one radio wave incoming structure located on the structure, and identifying a transmission characteristic of a wireless signal transmitted from the signal transmission location on the basis of information on the at least one radio wave incoming structure.

17 Claims, 21 Drawing Sheets

(56) References Cited

U.S. PATENT DOCUMENTS

| | | |
|---|---|---|
| 2010/0003991 A1 | 1/2010 | Pao et al. |
| 2011/0153294 A1 | 6/2011 | Yoon et al. |
| 2012/0165012 A1 | 6/2012 | Fischer et al. |
| 2014/0045439 A1* | 2/2014 | Eldering .............. H04W 16/18 455/67.16 |
| 2014/0114635 A1 | 4/2014 | Sato et al. |
| 2014/0257779 A1* | 9/2014 | Yoon ...................... G06F 30/20 703/6 |
| 2016/0055268 A1 | 2/2016 | Bell et al. |
| 2017/0338901 A1 | 11/2017 | Zhihua et al. |
| 2018/0138996 A1 | 5/2018 | Lee et al. |

FOREIGN PATENT DOCUMENTS

| | | |
|---|---|---|
| CN | 107087286 A | 8/2017 |
| KR | 10-2003-0086366 A | 11/2003 |
| KR | 10-2010-0010688 A | 2/2010 |
| KR | 10-1409388 B1 | 6/2014 |
| KR | 10-2014-0109658 A | 9/2014 |
| KR | 10-2018-0055623 A | 5/2018 |

OTHER PUBLICATIONS

Faisal A. K. Kakar et al.,"Essential factors influencing building penetration loss", Communication Technology, 2008. ICCT 2008. 11th IEEE International Conference on, IEEE, Piscataway, NJ, USA, Nov. 10, 2008, pp. 1-4, XP031374796.
Extended European Search Report dated Nov. 20, 2020, issued in European Patent Application No. 18890864.4.
Korean Office Action dated Nov. 22, 2021, issued in Korean Patent Application No. 10-2017-0174284.
Bernard De Backer et al., "Propagation Mechanisms for UHF Wave Transmission Through Walls and Windows", IEEE Transactions On Vehicular Technology, vol. 52, No. 5, pp. 1297-1307, Sep. 23, 2003.
Chinese Office Action dated Mar. 15, 2022, issued in Chinese Patent Application No. 201880081732.4.

* cited by examiner

METHOD AND APPARATUS FOR COMMUNICATION ENVIRONMENT ANALYSIS AND NETWORK DESIGN CONSIDERING RADIO WAVE INCOMING UNIT OF STRUCTURE

TECHNICAL FIELD

The disclosure relates to a method for modeling a radio communication environment to operate a wireless communication system, and performing an auxiliary device configuration and a network operation through the modeling, and an apparatus using the method. More particularly, the disclosure relates to a method for analyzing an indoor propagation aspect of a radio signal transmitted from an outdoor transmission device in a wireless communication environment using mmWave, modeling the communication environment based on the analysis, and performing an auxiliary device configuration and a network operation through the modeling, and an apparatus using the method.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access(NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

In the case of the recent communication system as described above, a communication signal in a relatively high frequency band is used, and thus it is necessary to analyze the wireless communication environment considering the high-frequency communication signals, to configure a network based on the analysis, and to operate the installed network.

DISCLOSURE OF INVENTION

Technical Problem

The disclosure is derived to solve the above-described problem, and an aspect of the disclosure is to provide a method for modeling a radio communication environment to operate a wireless communication system, and performing an auxiliary device configuration and a network operation through the modeling, and an apparatus using the method. Further, an aspect of the disclosure is to provide a method for analyzing the indoor propagation characteristics of a signal transmitted from an outdoor transmitter in a communication system using a high-frequency radio signal, modeling a radio communication for operating the communication system, and performing an auxiliary device configuration and a network operation through the modeling, and an apparatus using the method.

Solution to Problem

According to an embodiment of the disclosure to solve the above-described problem, a method for identifying radio signal transmission characteristics in a wireless communication system includes identifying a signal transmission location; identifying a structure; identifying at least one radio wave incoming structure located on the structure; and identifying transmission characteristics of a radio signal transmitted from the signal transmission location based on information on the at least one radio wave incoming structure.

According to another embodiment of the disclosure, a computing device analyzing signal transmission characteristics in a wireless communication system includes a transceiver configured to transmit and receive information; and a controller configured to: identify a signal transmission location, identify a structure, identify at least one radio wave incoming structure located on the structure, and identify transmission characteristics of a radio signal transmitted from the signal transmission location based on information on the at least one radio wave incoming structure.

Advantageous Effects of Invention

According to the embodiments of the disclosure, it is possible to obtain the radio wave transmission characteristics of the radio signal in the wireless communication system, to deploy the transmitter and the auxiliary device based on the obtained characteristics, and to operate the network based on the deployment.

MODE FOR THE INVENTION

Figure 1:
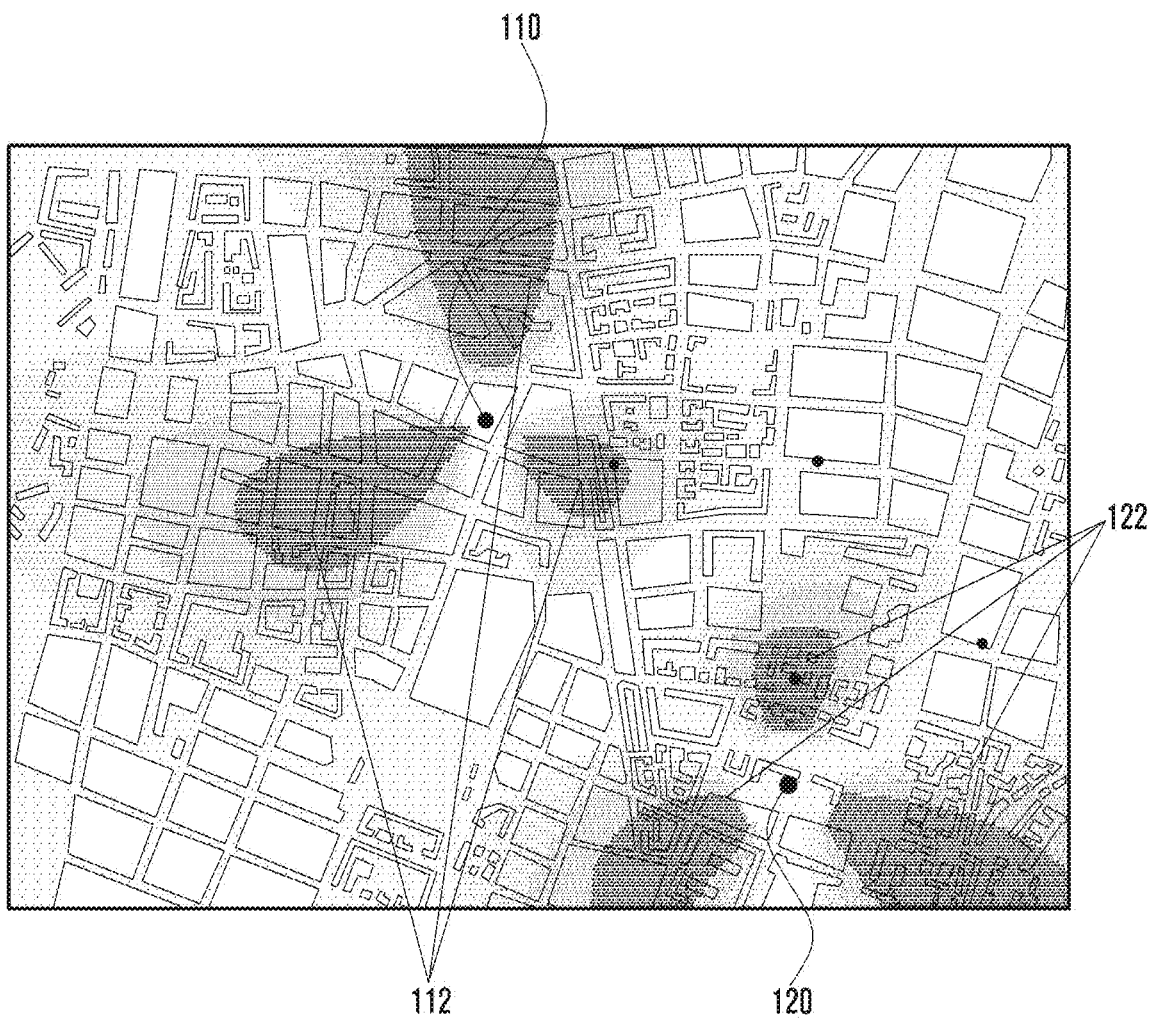
FIG. 1 is a diagram explaining a network design using a mathematical modeling technique.

Hereinafter, embodiments of the disclosure will be described in detail with reference to the accompanying drawings.

In explaining the embodiments, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Further, in the drawings for explaining a method according to an embodiment, the order of explanations may not always correspond to the order of executions, and the relationship of the executions may be changed, or the executions may be performed in parallel. Further, unless mentioned as essential in the embodiment, the executions may be selectively performed.

FIG. 1 is a diagram explaining a network design using a mathematical modeling technique.

With reference to FIG. 1, transmitters 110 and 120 may transmit signals by forming transmission beams 112 and 122.

The mathematical modeling technique as described above may predict RF information through a function explicitly expressed through a specific signal transmission/reception modeling technique with inputs of a frequency of the transmission signal, a distance, and the like. As in the drawing, the transmitters 110 and 120 may form beams 112 and 122 in three directions, respectively, and thus the RF characteristics of the transmission signals can be applied through the modeling technique. Through the mathematical modeling technique as described above, the RF information can be predicted with a smaller amount of computation, but a method for an accurate measurement is required at a higher frequency.

Figure 2:
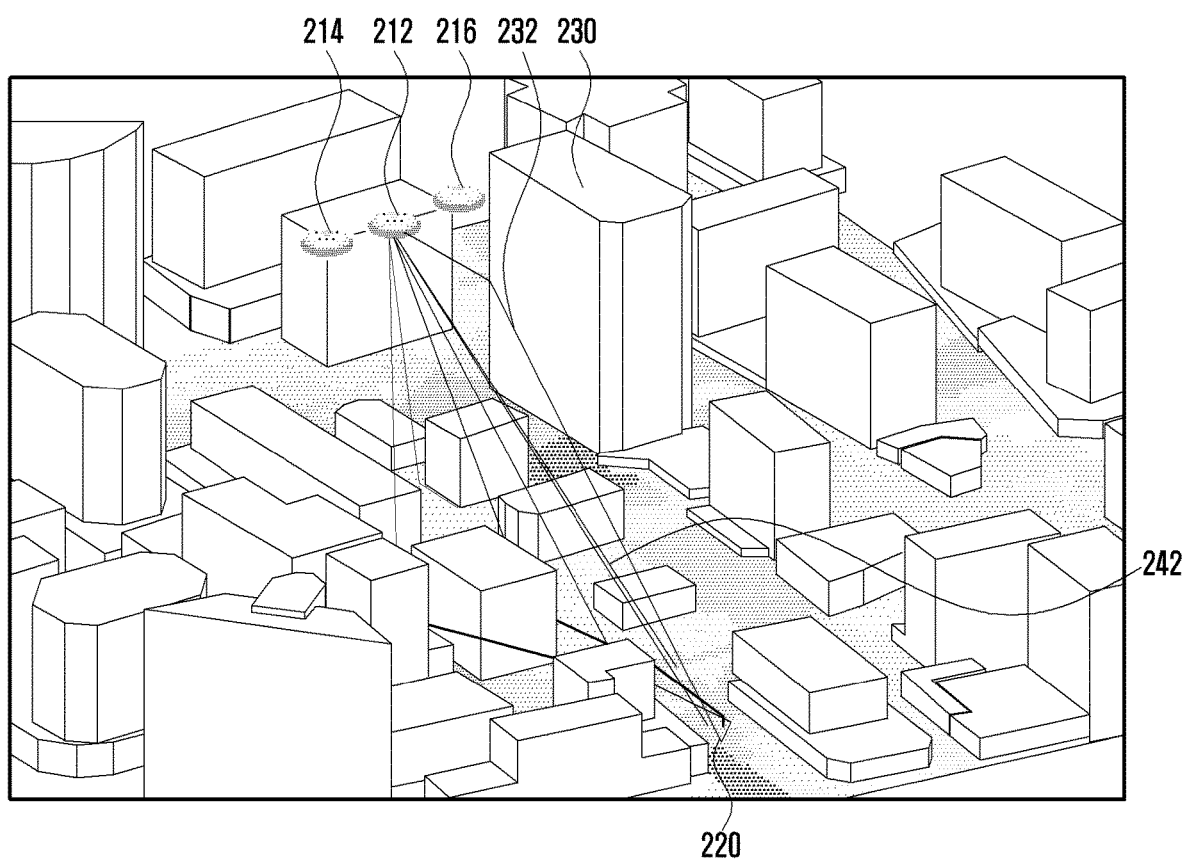
FIG. 2 is a diagram explaining a ray tracing simulation method according to an embodiment of the disclosure.

FIG. 2 is a diagram explaining a ray tracing simulation method according to an embodiment of the disclosure.

With reference to FIG. 2, under the assumption that one or more transmitters 212, 214, and 216 transmit signals, the reception strengths of the signals transmitted by the respective transmitters 212, 214, and 216 are displayed with contrast on a map. That is, a darker color represents an area having a stronger reception strength, and a thinner color represents a weaker signal strength.

More specifically, under the assumption of the location of a receiver 220, the reception strength of the signal in the corresponding area can be determined. Further, transmission channels for possible paths from one transmitter 212 to the receiver 220 can be determined. There may be a signal 242 that is directly transmitted from the transmitter 212 to the receiver 220 and a signal 232 that is reflected from another object 230 and then is received in the receiver 220. By performing the simulation according to the ray tracing as described above, it is possible to obtain information on the strengths of the signals received from the transmitters 212, 214, and 216 and transmission paths of the corresponding signals in a specific area. In the case of considering at least one of the surface material and the external shape of the object from which the signal is reflected when determining the signal reception strength in accordance with the transmission path of the signal, the receiver 220 can obtain more accurate signal reception information. In an embodiment, although the surface material is mentioned, the surface material does not mean only the external surface of the object, but it may include the material inside the object that may exert an influence on the reflection of the radio waves, and through such information, more accurate radio wave reflection features can be estimated.

Further, a radio wave transmittable obstacle may be located on a path on which the signal is directly transmitted. An example of the obstacle may be a tree, and in addition to the tree, obstacles that may cause signal attenuation while the radio waves penetrate the obstacles may be considered during the ray tracing simulation. As described above, in consideration of the information on the radio wave transmittable obstacle, more accurate simulation results can be obtained. Although the tree is exemplified as the obstacle which is located on the communication path and which causes the signal attenuation during the radio wave transmission, another plant or installation installed on the communication path may also be the obstacle, and in addition, other objects that may cause the signal attenuation may be included as the obstacles.

As described above, by performing the ray tracing, at least one of the optimum transmitter location and the optimum receiver location may be determined on the map. Further, according to an embodiment, the ray tracing simulation may be performed in consideration of a plurality of transmitter location candidates and receiver location candidates, and in accordance with the ray tracing results, at least one of the transmitter location and the receiver location can be determined.

As described above, the ray tracing simulation technique may determine the transmission channels for the respective paths through which the RF signal passes, and it may predict RF signal information at the location of the receiver 220 based on the determination. In an embodiment, the ray tracing simulation technique can predict more accurate RF signal information by calculating at least one of a distance in which the signal is transmitted, an environment of the path (e.g., kind of medium), and reflection and diffraction by a 3D terrain and a building in the process of determining the channel environment in accordance with the signal path. Further, according to a channel estimation method through the above-described technique, there is no limit in the frequency of the RF signal, an actual environment can be elaborately reflected, and at least one of the optimum transmission location and the reception location can be determined based on the simulation results.

Further, in a 5G network, an ultrahigh frequency signal of 28 to 60 GHz is used. Accordingly, in order to find out the radio signal information in the 5G network design tool, accuracy can be heightened using the ray tracing simulation technique rather than the mathematical modeling technique. In an example of the ray tracing simulation, the reflection may be calculated under the assumption that surfaces of all buildings have the same RF property when the path of the radio wave that is reflected from the building is predicted. However, because the reflectivity of the RF signal differs depending on the surface material of the reflection surface, external shape and pattern, such an assumption does not guarantee accurate simulation results, and thus a ray tracing technique considering the corresponding information is required.

Figure 3A:
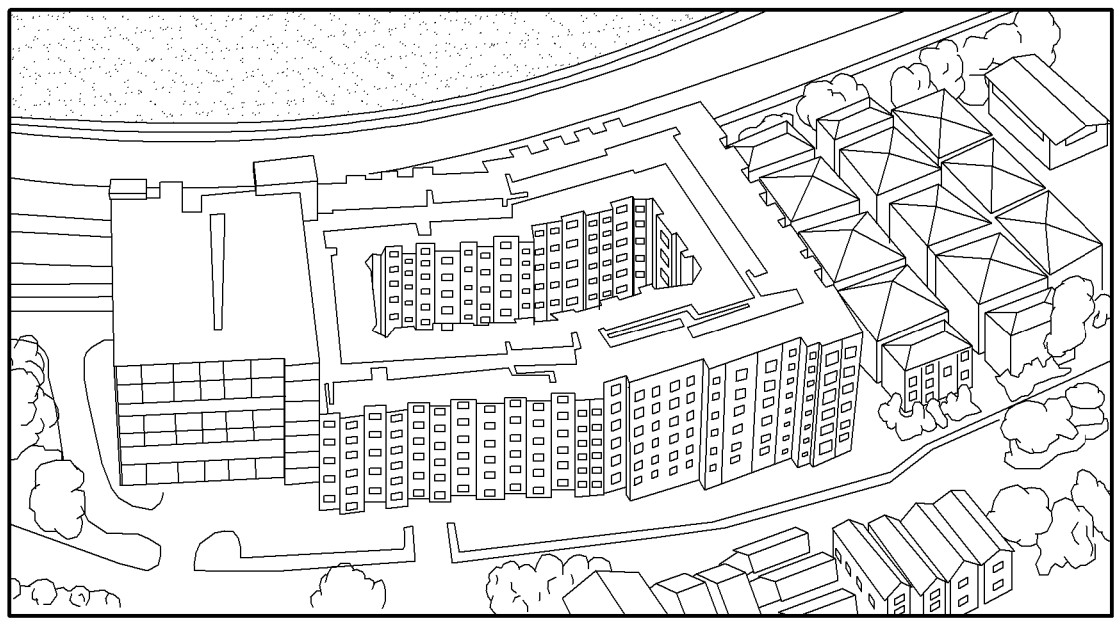
FIG. 3A is a diagram explaining a method for obtaining 3D map information according to an embodiment of the disclosure.
Figure 3B:
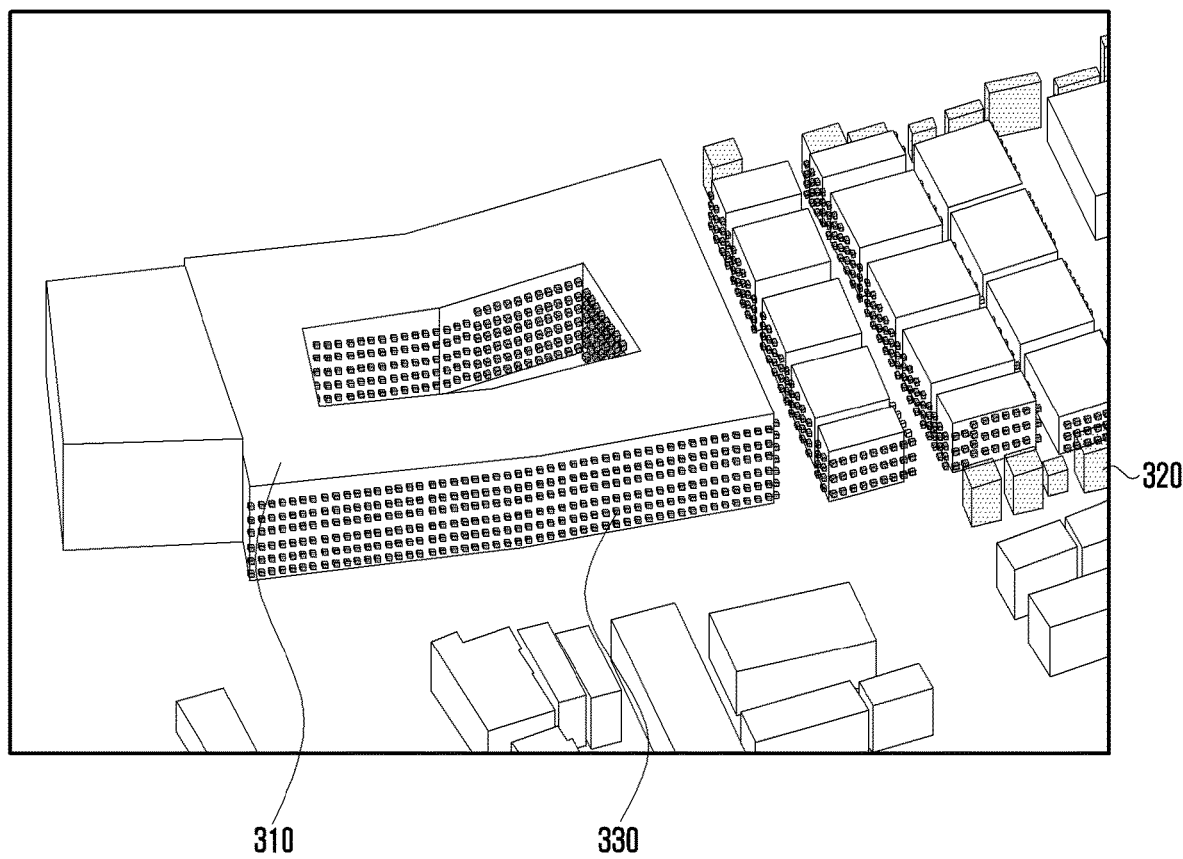
FIG. 3B is a diagram explaining a method for obtaining 3D map information according to an embodiment of the disclosure.

FIGS. 3A and 3B are diagrams explaining a method for obtaining 3D map information according to an embodiment of the disclosure.

With reference to FIGS. 3A and 3B, 3D map information may be obtained based on actual image information of FIG. 3A and location information corresponding to the image information. More specifically, the 3D map information of FIG. 3B may be obtained so that the ray tracing simulation can be performed based on the image information.

In FIG. 3B, the obtained map information may include a building 310, a receiver candidate area 330, and a tree 320. Based on the map information obtained as above, transmitter location candidates and receiver location candidates may be determined, and at least one of the optimum transmitter location and receiver location may be determined by performing the ray tracing simulation.

Further, in an embodiment, in the case of an element, such as the building 310, it may be featured to reflect or scatter the radio waves, and in consideration of the surface material and the external shape of the element as described above, more accurate simulation results can be obtained.

Further, in an embodiment, in the case of the tree 320, radio wave transmission may be possible, but the transmitted radio wave may suffer great signal attenuation as compared with the air. As described above, in consideration of the radio wave transfer characteristics through the object, such as the tree 320, more accurate simulation results can be obtained.

Further, in an embodiment, the receiver candidate area 330 may be selectively performed in accordance with the ray tracing, and it may include an area in which a fixed or movable receiver can be installed. More specifically, a receiver may be installed in a window area of the building 310, and during communication between another receiver inside the building and a transmitter outside the building, the receiver installed in the window area may serve as a relay. As described above, by performing the ray tracing simulation in consideration of the receiver candidate area 330, the resultant value in consideration of a more preferable signal reception environment can be obtained.

Figure 4A:
FIG. 4A is a diagram explaining a method for obtaining material information of an object within an image through image information according to an embodiment of the disclosure.
Figure 4B:
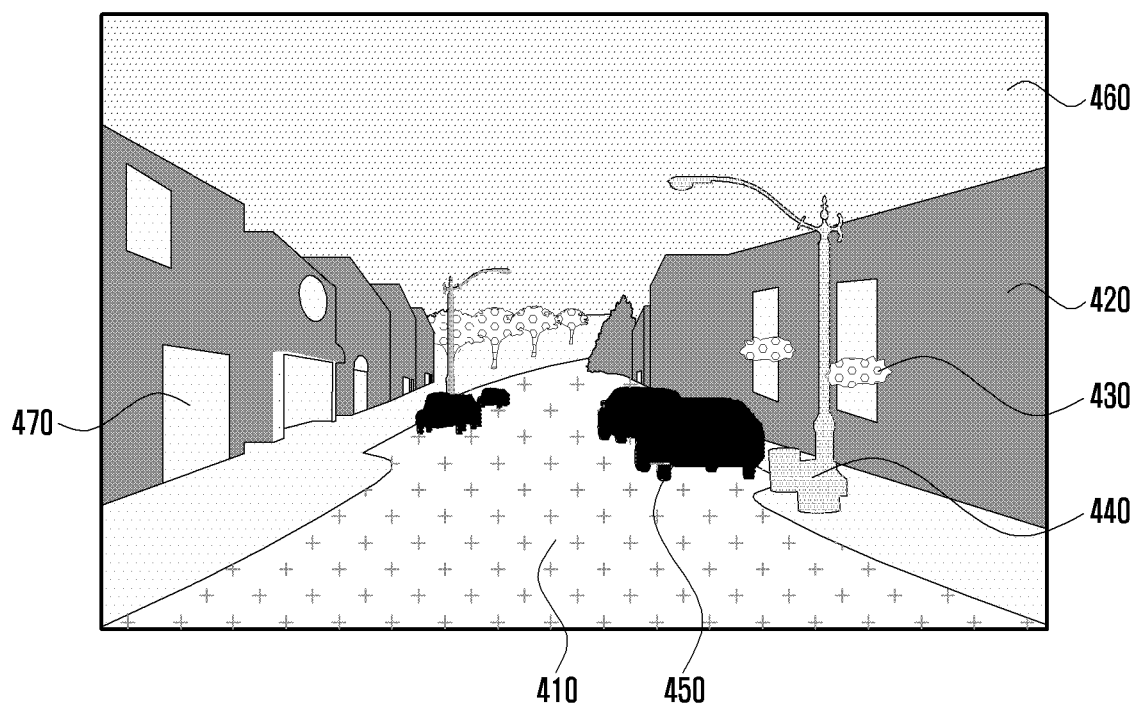
FIG. 4B is a diagram explaining a method for obtaining material information of an object within an image through image information according to an embodiment of the disclosure.

FIGS. 4A and 4B are diagrams explaining a method for obtaining material information of an object within an image through image information according to an embodiment of the disclosure.

With reference to FIGS. 4A and 4B, the material of an object displayed inside an image may be determined from image information. More specifically, it is possible to determine the material of the object inside the image based on deep running based computer vision technology from image information. The features related to the detailed deep running based computer vision technology will be described later.

In an embodiment, by analyzing the image information of FIG. 4A, the results of FIG. 4B may be obtained. In this case, respective elements may be determined based at least one of a color displayed inside the image, contrast, reflectivity, mutual location relationship between respective elements, and deployment of total constituent elements of the image. In an embodiment, it is possible to determine the material, such as asphalt 410, concrete 420, plant 430, iron structure 440, vehicle 450, sky 460, or glass 470. As described above, more accurate results may be obtained by determining the materials of the elements displayed inside the image through the image information and reflecting the characteristics of the materials in the ray tracing simulation.

Figure 5:
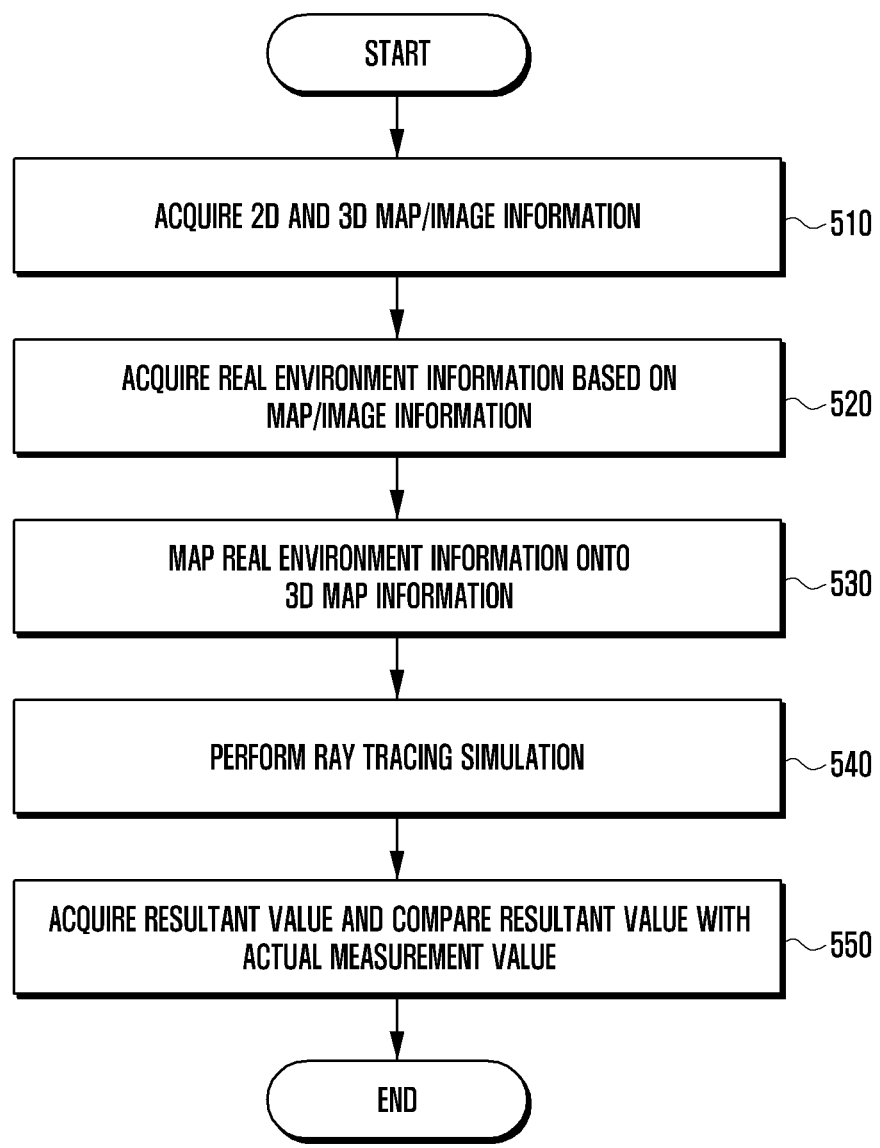
FIG. 5 is a diagram explaining a method for analyzing a communication channel environment through ray tracing according to an embodiment of the disclosure.

FIG. 5 is a diagram explaining a method for analyzing a communication channel environment through ray tracing according to an embodiment of the disclosure.

With reference to FIG. 5, a method for performing a ray tracing simulation is disclosed. In an embodiment, the ray tracing simulation may be performed by a computing device including a controller. The computing device may be a computing device including a central control processor, and it may include a personal computer and a workstation. In the following embodiment, it may be mentioned that the simulation is performed by the computing device.

At operation 510, the computing device may obtain 2D image information and 3D map information. In an embodiment, the 2D image information may include additional information corresponding to an image, and the additional information may include image capturing information including location information at which the image is captured, direction information, and an angle of view. Based on the additional information, the 3D map information corresponding to the 2D image information may be determined. This information may include shape information of buildings, structures, and plants on the ground or water, and according to an embodiment, the information may include information related to at least one of a transmitter candidate location and a receiver candidate location.

At operation 520, the computing device may obtain actual environment information based on at least one of map information and image information. The actual environment information may include an object located on a communication path and the characteristics of the object. More specifically, the 2D image information may be analyzed, and based on this, the characteristics of objects that may be located on the communication paths may be determined. The characteristics of the objects may include at least one of the surface material of the object and the external shape of the object, and in the case of the radio wave transmittable object, the characteristics may include information related to the shape of the object and the degree of signal attenuation during the transmission.

At operation 530, the computing device may perform mapping of the actual environment information of the communication path onto the 3D map information. As described above, during mapping onto the 3D map information, it is possible to perform mapping of the additional information obtained through the 2D image information onto the object corresponding to the 3D map information based on the additional information included in the 2D image information.

At operation 540, the computing device may perform the ray tracing simulation based on the information generated through operation 530. In an embodiment, the ray tracing simulation may be performed in a manner that the corresponding ray tracing simulation is performed as the beam information is successively changed in consideration of the beam in a specific direction, or the corresponding ray tracing simulation is performed under the assumption that the transmitter transmits the beams in all directions in which the transmitter can transmit the beams in the same time period. The quality of the signal that can be received by the receiver may be predicted and analyzed through reflection of the path through which the signal transmitted from the transmitter is received by the receiver and the actual environment information located on the path as the result of performing the ray tracing simulation. Further, in an embodiment, when the ray tracing simulation is performed, at least one of the transmission location and the reception location may be determined based on the 3D map information, and the signal transmission environment may be determined based on the information mapped at operation 530.

At operation 550, the resultant value may be obtained based on the ray tracing simulation, and an additional ray tracing simulation may be performed based on the obtained resultant value and the value measured in the actual environment. More specifically, the simulated resultant value and the actual environmental measurement value are compared with each other, and if the compared values are different from each other, the simulation resultant value may be regenerated by changing the information obtained at operation 520 based on the actual environmental measurement value. As described above, by performing the ray tracing simulation through reflection of the actual environmental information in the 3D map, the communication channel can be analyzed more reliably. More specifically, the transmitter and the receiver may be directly installed in an area subject to the ray tracing simulation, and the base information for performing the ray tracing simulation based on the signal transmitted by the transmitter and the resultant value received by the receiver may be added or updated.

As described above, based on the ray tracing simulation result, at least one of the optimum transmitter location and receiver location for providing the radio service in the specific area in the map may be determined. As described above, by determining at least one of the optimum transmitter location and receiver location, an effective network design can be performed. More specifically, the optimum base station location may be determined in order to effectively provide the radio signal to a wireless terminal in the specific area. As described above, by determining the optimum base station location, an effective service can be provided even in the case of deploying a smaller number of base stations.

Further, adaptive network management may be possible by reflecting the signal reception information measured in the actual environment. More specifically, if the surrounding environment is changed after the transmitter is installed, an additional ray tracing simulation in consideration of the changed environment may be performed, and the network management, such as adjustment of the transmitter location through additional reflection of the resultant value, may be performed. Further, such network management may include a change of beam related information transmitted by the transmitter in addition to adjustment of the transmitter location. More specifically, the transmitter may determine the transmission beam and the reception beam based on the ray tracing simulation resultant value. In order to determine the transmission beam and the reception beam as described above, a beam alignment may be performed based on the ray tracing simulation resultant value. The adaptive network management as described above may be periodically performed.

Figure 6:
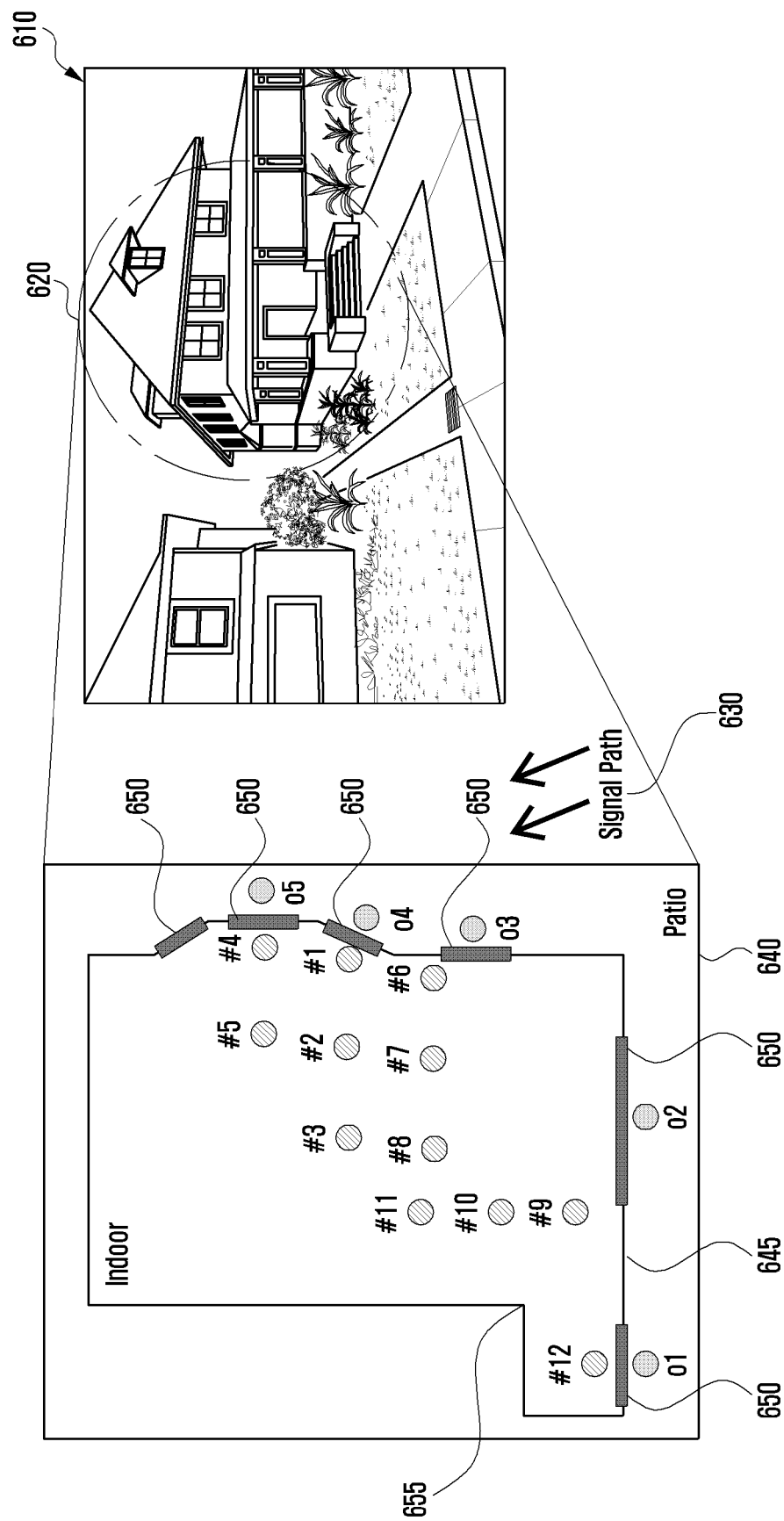
FIG. 6 is a diagram explaining measurement of indoor and outdoor radio wave reception quality of a structure according to an embodiment of the disclosure.

FIG. 6 is a diagram explaining measurement of indoor and outdoor radio wave reception quality of a structure according to an embodiment of the disclosure.

With reference to FIG. 6, a transmission device may be located outside. With reference to 610 related to a structure for signal measurement, if the transmission direction 630 of the radio signal transmitted by the transmission device is formed as in the drawing, the signal reception quality may be measured in a place adjacent to the structure 620 or in the interior of the structure 620. In an embodiment, the signal reception quality may include a signal reception power, and it may also include information indicating whether the signal is distorted and information, such as an interference-to-signal ratio.

The structure 620 may include a patio 640, and measurement points located inside and outside the patio may be indicated as o1 to o5, and measurement points located indoors may be indicated as #1 to #12. The reception quality of the signal transmitted by the transmission device may be determined at the respective measurement points.

The structure may include a structure, such as a wall 655, through which the radio wave transmission is difficult and by which the radio wave is actually blocked and a structure, such as a window 650, through which the radio waves can transmit to the inside. As described above, the signal quality measured indoors may differ depending on the structures of respective parts constituting the structure. In an embodiment, the radio wave transmittable structure, which is referred to the window 650, may include a structure through which the radio waves can income from the outside of the structure to the interior of the structure, and it may be made of a material through which the radio waves can easily transmit. Further, even in the case where the radio wave transmission is not easy, the structure through which the radio waves can actually transmit may be determined as the radio wave incoming structure.

More specifically, in the case of indoor measurement points, the radio wave reception quality measured at measurement points #1, #4, #6, #9, and #12 adjacent to the window 650 may be good.

In this case, the location, size, material, and surrounding structure of the window 650 may exert an influence on the quality of the signal that may be propagated indoors, and in consideration of the above-described elements and the locations of the windows on the structure, the signal propagation environment can be more accurately predicted indoors.

Figure 7:
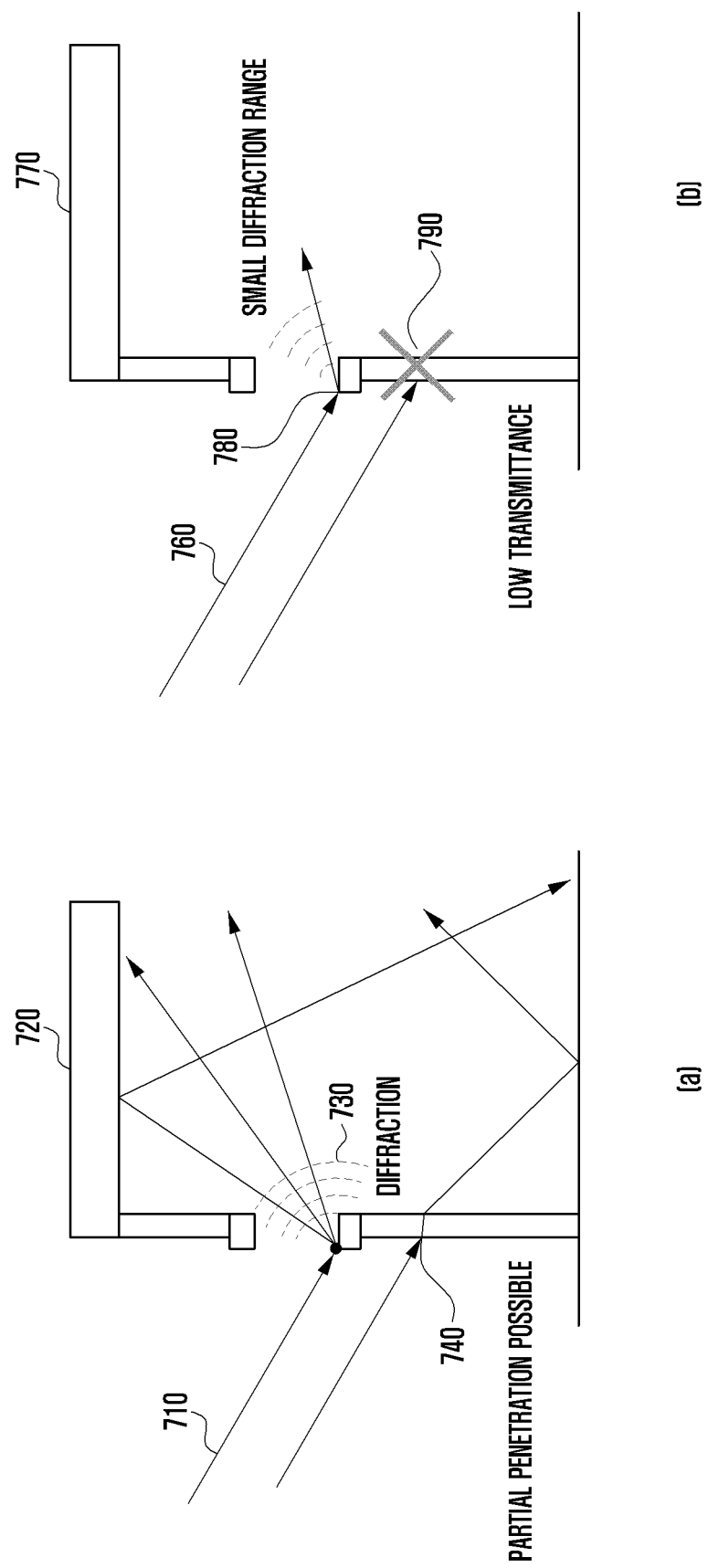
FIG. 7 is a diagram explaining an aspect of a signal that propagates to an inside of a structure in accordance with a frequency of the signal.

FIG. 7 is a diagram explaining an aspect of a signal that propagates to an inside of a structure in accordance with a frequency of the signal.

With reference to FIG. 7, an aspect of radio waves transmitted outdoors that are transmitted to an inside through a radio wave incoming structure, such as a window, is illustrated. More specifically, a propagation aspect of the signal that may be propagated indoors in accordance with the frequency of the transmitted radio waves is illustrated.

In the case of (a) in FIG. 7, a propagation aspect is illustrated, in which a low-frequency radio signal 710 is propagated, a part of the radio signal penetrates (740) a wall 720, another part of the radio signal is propagated indoors through an incoming structure, and another part of the radio signal is propagated indoors through diffraction (730) in the neighborhood of the incoming structure.

In the case of (b) in FIG. 7, a propagation aspect is illustrated, in which a high-frequency radio signal 760 is propagated, a part of the radio signal penetrates (790) a wall 770, another part of the radio signal is propagated indoors through an incoming structure, and another part of the radio signal is propagated indoors through diffraction (780) in the neighborhood of the incoming structure.

In the case of the high-frequency radio signal 760, it has low transmittance and a small diffraction range as compared with the low-frequency radio signal 710, and except the signal directly passing through the incoming structure, the indoor propagation thereof may be difficult as compared with the low-frequency radio signal, and thus it is necessary to analyze the indoor propagation environment in consideration of the radio wave incoming structure.

Further, the characteristics of the material and the thickness of the radio wave incoming structure, the object located on the incoming structure, such as the window frame, and the structure located adjacent to the incoming structure may exert an influence on the indoor propagation aspect of the radio signal, and thus it is necessary to consider this.

Figure 8:
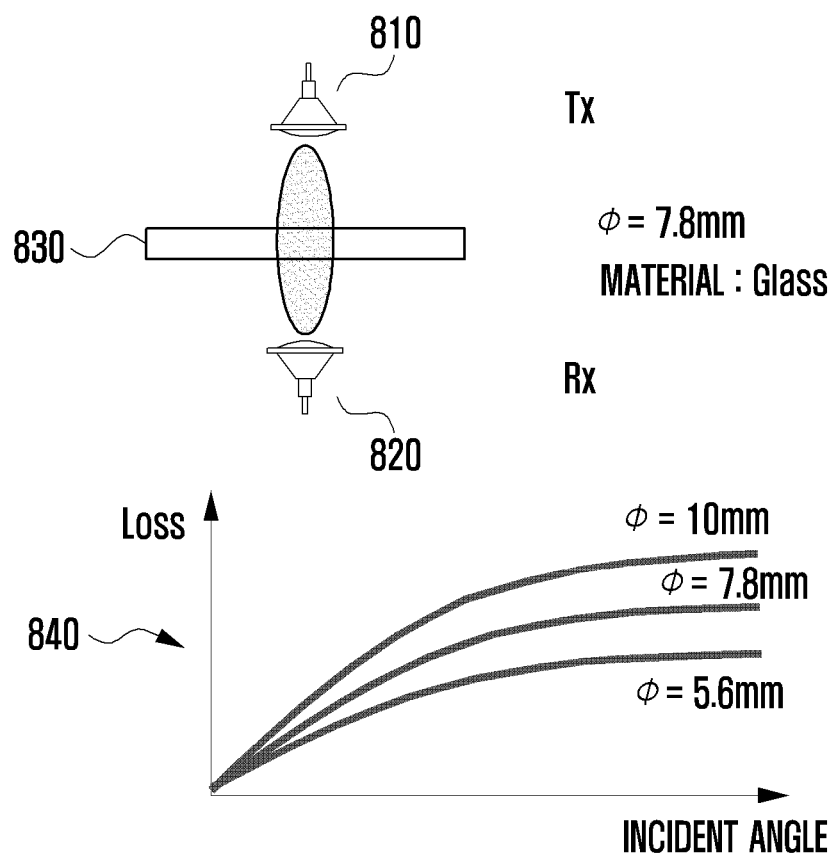
FIG. 8 is a diagram explaining a loss of radio waves due to the thickness of a transmittable object and an incident angle of the radio waves when the radio waves transmit through the object.

FIG. 8 is a diagram explaining a loss of radio waves due to the thickness of a transmittable object and an incident angle of the radio waves when the radio waves transmit through the object.

With reference to FIG. 8, a transmittable object 830 may be put between a transmitter 810 and a receiver 820, and a signal loss 840 may be measured in accordance with an incident angle and the thickness of the transmittable object 830.

In an embodiment, the incident angle is minimized when the signal is vertical to the transmittable object 830, whereas the incident angle is maximized when the signal is parallel to the transmittable object 830.

As described above, the signal loss may be increased in the case where the transmittable object 830 has a large thickness and the incident angle is large, and based on this, the indoor propagation aspect of the radio signal may be determined based on the material and the thickness of the transmittable object 830 located on the radio wave incoming structure, and the radio wave incident angle.

Figure 9:
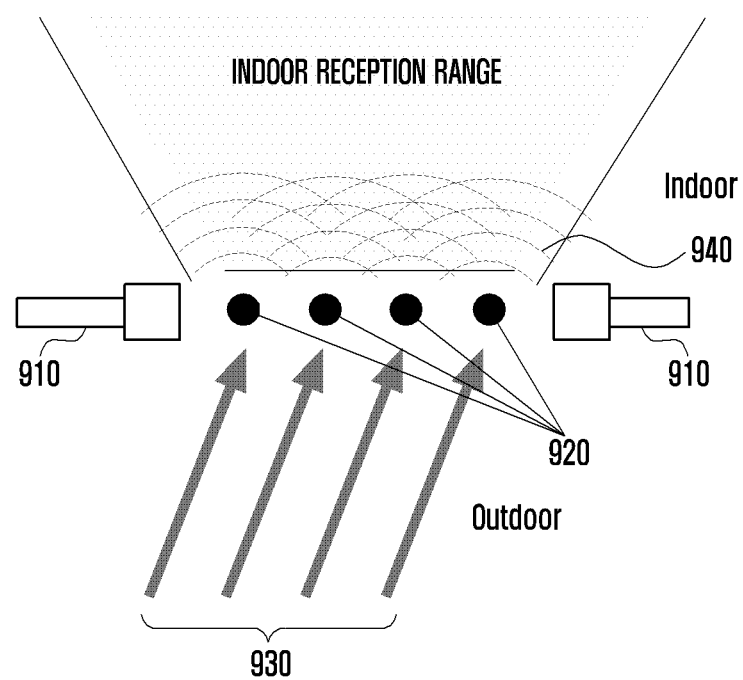
FIG. 9 is a diagram explaining a radio wave transmission aspect in accordance with a deployment of an object that is located on a radio wave incoming structure located on a structure.

FIG. 9 is a diagram explaining a radio wave transmission aspect in accordance with a deployment of an object that is located on a radio wave incoming structure located on a structure.

With reference to FIG. 9, an indoor radio signal propagation aspect is illustrated in accordance with the deployment shape of an object 920 located on the radio wave incoming structure.

The radio wave incoming structure may be formed on a part of a wall 910 of a structure, and an aspect 940 of an indoor propagation of a radio signal 930 transmitted from the outside may differ depending on the deployment of the object 920 located on the radio wave incoming structure. The object 920 located on the radio wave incoming structure may be a window frame of a window, and the propagation aspect of the radio signal may differ depending on the number of deployments of the object and the thickness direction.

As an example, if the thickness of the window frame is thin, and if the number of window frames is large, the radio signal may be diffracted by the window frames, and thus the radio signal may be transferred in a wider indoor range.

As described above, in consideration of the object 920 located on the radio wave incoming structure, it is possible to determine the aspect of whether the radio signal transmitted from the outside can be propagated indoors.

Figure 10:
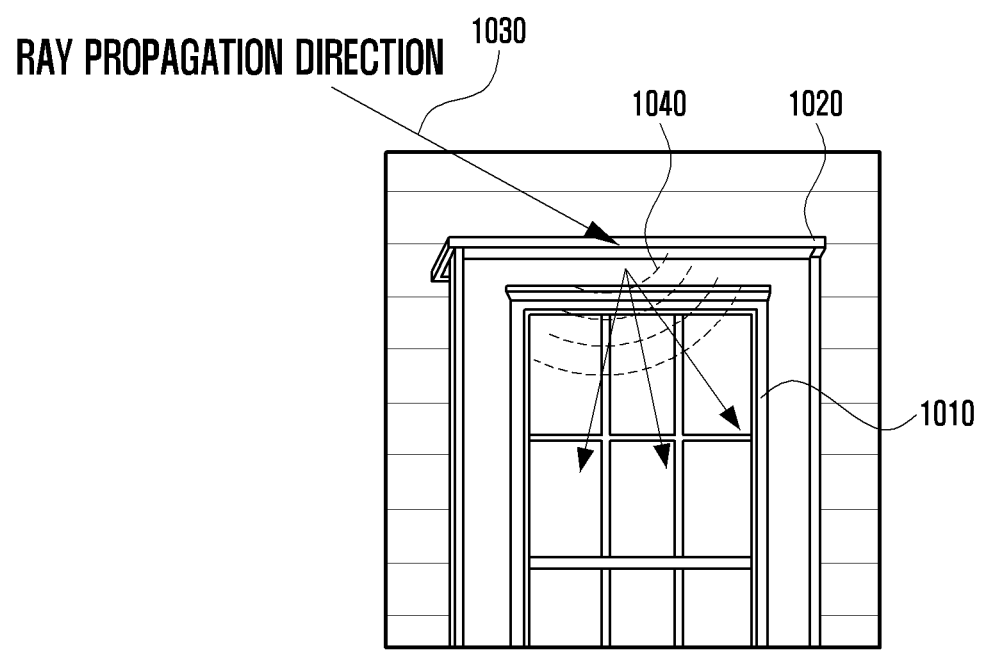
FIG. 10 is a diagram explaining a radio wave propagation aspect in accordance with an object adjacent to a radio wave incoming structure located on a structure.

FIG. 10 is a diagram explaining a radio wave propagation aspect in accordance with an object adjacent to a radio wave incoming structure located on a structure.

With reference to FIG. 10, a propagation aspect of a radio signal is illustrated in accordance with a deployment shape of an object 1020 adjacent to a radio wave incoming structure 1010.

In an embodiment, as the radio signal 1030 is propagated in an illustrated direction, and it is reflected, scattered, and diffracted by the adjacent object 1020, a partial component of the radio signal 1030 may be propagated indoors through the radio wave incoming structure 1010. As described above, in accordance with the deployment of the object 1020 adjacent to the radio wave incoming structure 1010, the aspect of the radio signal propagation from outside to inside may differ, and in consideration of this, more accurate radio signal propagation characteristics can be determined. In an embodiment, the distance for determining the adjacent object 1020 may be determined based on at least one of the frequency of the measured radio signal, the size of the radio wave incoming structure 1010, and the size of the adjacent object 1020. More specifically, the distance may be determined in proportion to or in reverse proportion to the frequency of the radio signal. Further, if the radio wave incoming structure 1010 is large, it becomes possible to analyze the farther apart object. Further, even if the size of the adjacent object 1020 is large, the radio signal transmission characteristics can be analyzed even with respect to the farther apart object.

Further, according to an embodiment, the distance for determining the adjacent object 1020 may be predetermined.

Figure 11:
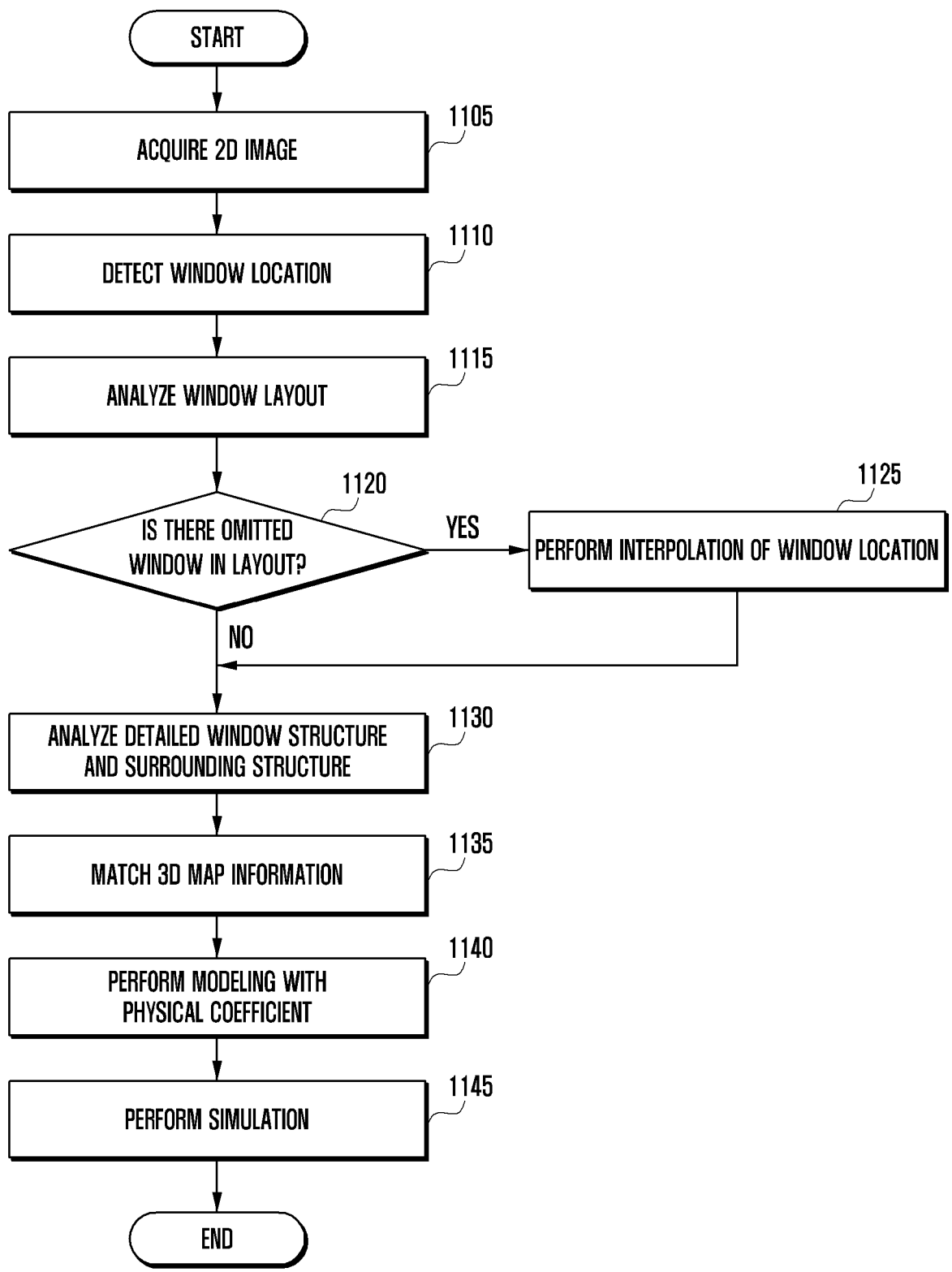
FIG. 11 is a diagram illustrating a method for simulating a signal propagation aspect in consideration of a radio wave incoming structure according to an embodiment of the disclosure.

FIG. 11 is a diagram illustrating a method for simulating a signal propagation aspect in consideration of a radio wave incoming structure according to an embodiment of the disclosure.

With reference to FIG. 11, it is possible to determine a radio wave incoming structure from a structure and the location of the structure based on 3D map data and corresponding 2D image information, and to analyze the radio signal propagation characteristics based on the features related to the radio wave incoming structure. Through this, it is possible to determine the characteristics of radio wave transmission inside the structure, and to determine information related to installation of an auxiliary device for smoother indoor signal transmission. In an embodiment, so called 3D map data may be data including 3D map information of a landmark and a structure, and in an embodiment, the 2D image information may include image data corresponding to respective locations of the map data.

At operation 1105, the computing device may obtain 2D image information corresponding to 3D map information. In an embodiment, the 2D image information may include 2D image data corresponding to respective locations of the 3D map information. According to an embodiment, the 2D image information may include a street view corresponding to the 3D map information.

At operation 1110, the computing device may analyze the location of the radio wave incoming structure including a window and the characteristics of the window from the image corresponding to the structure in the 2D image information. In an embodiment, the characteristics of the window may include the size of the window. In an embodiment, the location analysis may include determination of the radio wave incoming structure through image processing, and it may analyze the radio wave incoming structure including the window based on at least one of repeated image pattern, color, material, and light reflectivity. Based on this, the computing device may detect at least one window location. Further, in an embodiment, machine learning may be used in order to analyze the window location and the window characteristics as described above. The location and the characteristics of the radio wave incoming structure, such as the window, may be determined from the structure by analyzing the image through repeated learning of the structure, such as a building.

At operation 1115, the computing device may analyze the layout of the window from the whole structure based on the detected window location. More specifically, the deployment of the radio wave incoming structure including the window may be determined from the whole structure through the repeated window pattern.

At operation 1120, the computing device may determine whether any omitted window exists based on the layout of the window. More specifically, if the omitted window location exists in the repeated pattern, it may be determined whether window location identification is omitted through the 2D image analysis.

At operation 1125, if the omitted window exists, the window location may be interpolated. More specifically, it may be determined through the image analysis whether the window is located in a location where it is determined that the window is omitted.

At operation 1130, the computing device may perform at least one of analysis of the detailed structure of the identified window and analysis of a surrounding structure. More specifically, the computing device may analyze whether a window frame of the window exists and the deployment and the characteristics of the window frame. Further, the computing device may analyze the characteristics of the material of the window. Further, the computing device may analyze a structure surrounding the window. Based on the analysis result as described above, the computing device can obtain more accurate result when performing modeling for determining the radio wave transfer characteristics.

At operation 1135, the computing device may match the obtained information with the 3D map information. More specifically, the computing device may perform mapping of physical parameters capable of indicating the radio wave incoming structure and the characteristics of each structure onto the 3D map, and through this, the computing device may perform the analysis of the radio signal propagation characteristics.

At operation 1140, the computing device may perform modeling of the matched information as a physical coefficient. More specifically, when performing the simulation based on the previously obtained physical parameter, the computing device may perform modeling as the physical coefficient so as to analyze the propagation characteristics of the radio signal. In an embodiment, the modeling complexity can be lowered by bundling the structures having the similar propagation characteristics in the same category.

At operation 1145, the computing device may perform the simulation related to the radio signal propagation based on the modeled information at the previous operation, and through this, the computing device may analyze the radio signal propagation characteristics.

In an embodiment, operations 1110 to 1125 may be entirely performed at operation 1110, and performing of the window location interpolation according to the window layout analysis may be omitted according to the embodiment. Further, the modeling may be performed with a part of the obtained information omitted according to the embodiment, and through this, the computing complexity can be lowered. More specifically, omission of the part of the obtained information may be determined by the characteristics, such as the frequency of the transmitted signal. More specifically, in the case of performing the simulation of the signal having the low reflection characteristics, the simulation may be performed with omission of the information related to the structure adjacent to the radio wave incoming structure.

In an embodiment, as an example of the simulation, the map information may be obtained, and the image information corresponding to the map, such as the street view, may be obtained. The location of the structure may be determined based on the image information, such as the map information or the street view, and the radio wave incoming structure and the characteristics may be analyzed from the structure based on the image information. The radio signal propagation simulation in consideration of the structure and the radio wave incoming structure may be performed by mapping the analyzed information onto the map information again and by modeling the propagation characteristics as the physical coefficient based on the mapping.

Figure 12:
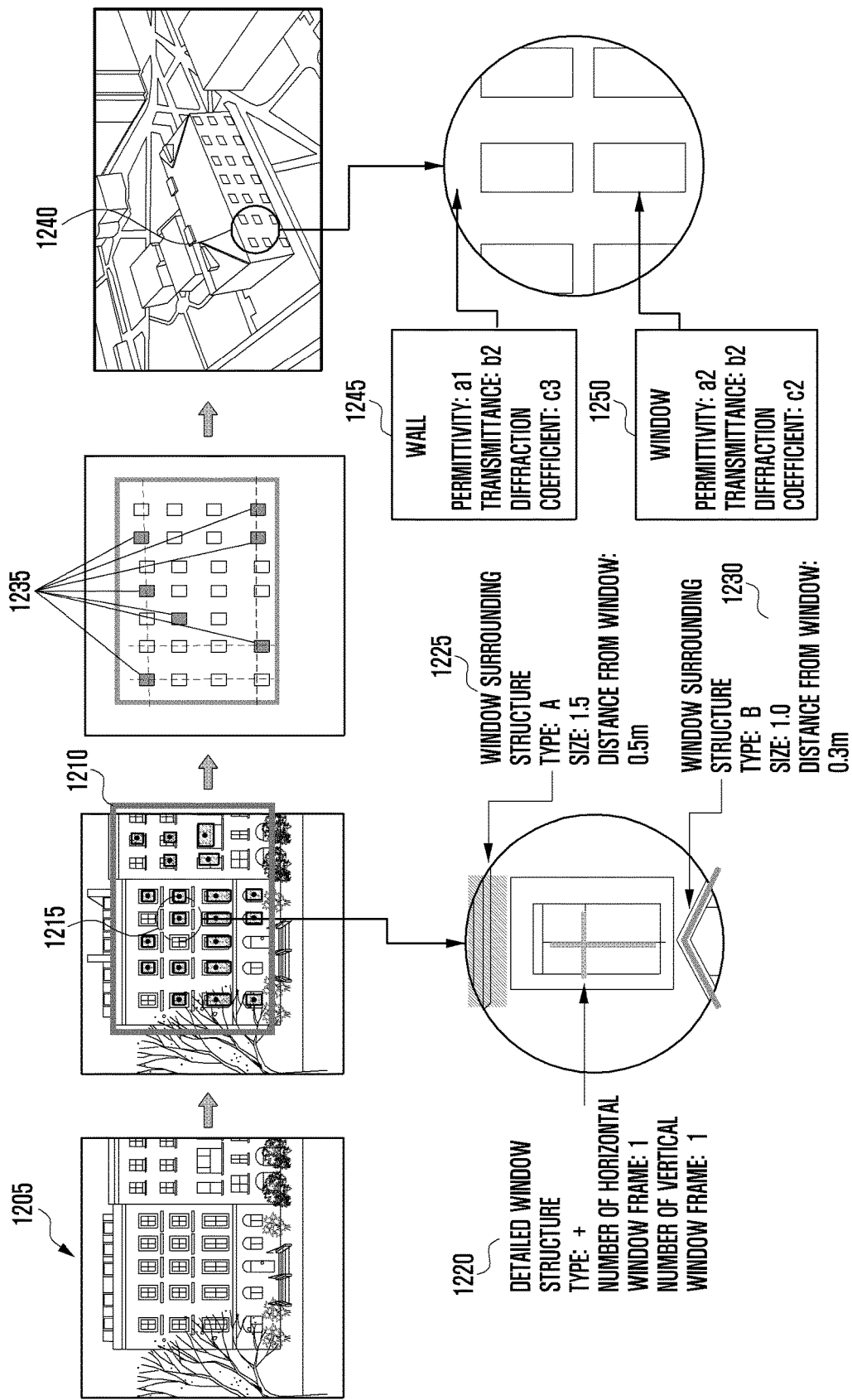
FIG. 12 is a diagram explaining a process of simulating a signal propagation aspect in consideration of a radio wave incoming structure according to an embodiment of the disclosure.

FIG. 12 is a diagram explaining a process of simulating a signal propagation aspect in consideration of a radio wave incoming structure according to an embodiment of the disclosure.

With reference to FIG. 12, the computing device may identify the characteristics of the radio wave incoming structure of the structure based on the 2D image, and it may perform the mapping onto the 3D map.

The computing device may obtain information of 2D image 1205. The computing device may identify the structure through image analysis.

The computing device may identify the location of a building 1210 from the image 1205, and it may identify the location of the window 1215 deployed on the building. The location of the building 1210 and the location of the window 1215 as described above may be performed through the image analysis. More specifically, at least one window candidate group may be determined based on the image analysis, and an additional window may be searched for based on the deployment of the candidate group.

Further, the computing device may identify the detailed structure 1220 of the window and the window surrounding structures 1225 and 1230 from the identified window 1215, and the computing device may perform this through the image analysis. The type of the detailed structure on the window may include the deployment and the thickness of the window frame, and it may include the number of window frames deployed in respective directions. The window surrounding structure may include a distance from the window, and the type may also be included based on the deployment relationship with the window.

Further, the computing device may interpolate the omitted window 1235 through the image analysis based on the analyzed locations of the building 1210 and the window 1215. In the above-described interpolation procedure, the window deployment state and the building structure may be considered. More specifically, if the window is not deployed in a part of the building having a symmetric structure, the computing device may determine the same as the omitted window, or it may determine whether the window is omitted through an additional image analysis.

As denoted by identification number 1240, the computing device may perform mapping of the information obtained through the image analysis onto the 3D map information. More specifically, the computing device may perform mapping of the wall characteristics and window characteristics of the building, and it may analyze the signal propagation characteristics based on at least one of the permittivity, transmittance, and diffraction coefficient.

Figure 13:
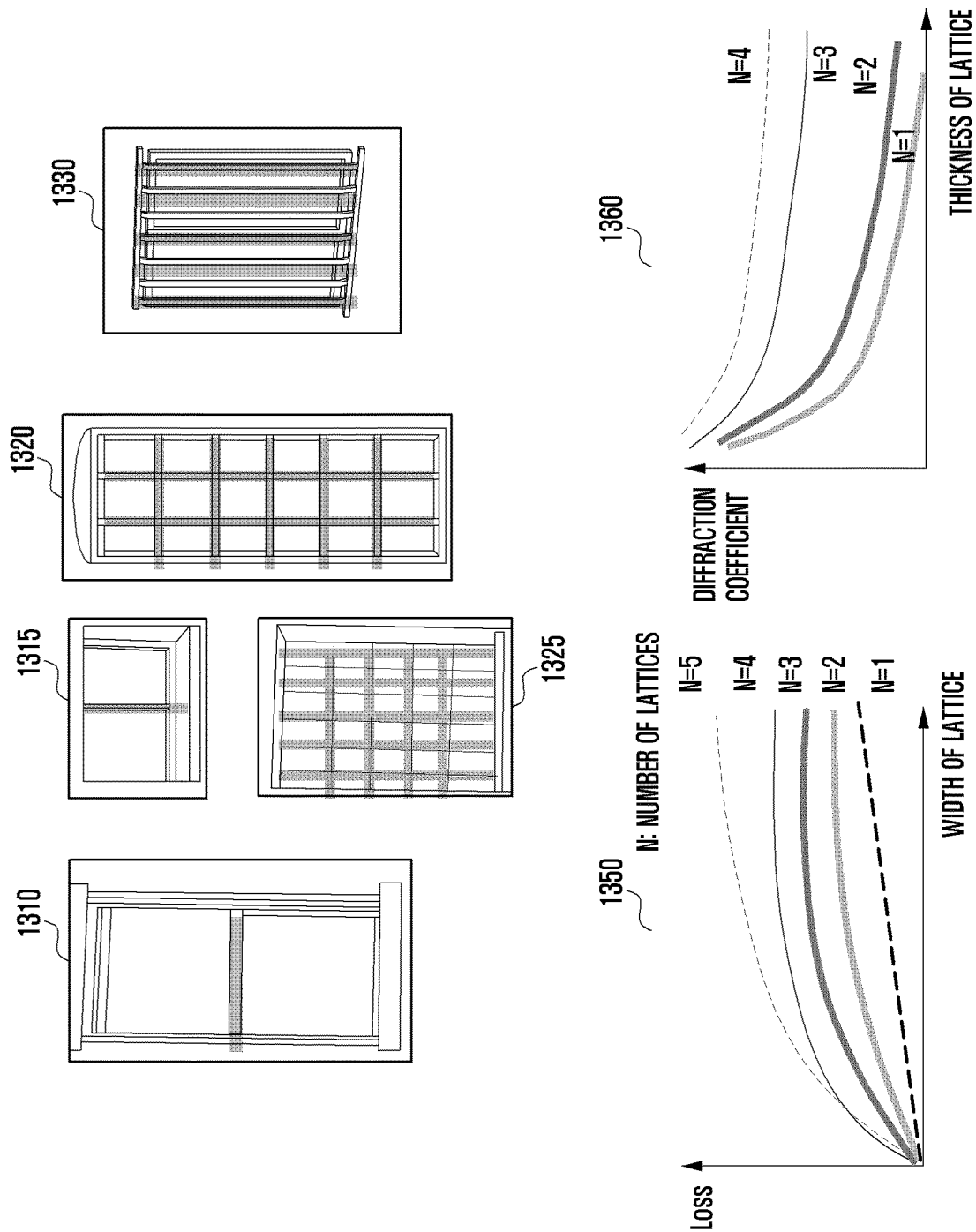
FIG. 13 is a diagram illustrating radio wave loss and diffraction characteristics in accordance with a detailed structure of a radio wave incoming structure according to an embodiment of the disclosure.

FIG. 13 is a diagram illustrating radio wave loss and diffraction characteristics in accordance with a detailed structure of a radio wave incoming structure according to an embodiment of the disclosure.

With reference to FIG. 13, the computing device may identify the detailed structure on the radio wave incoming structure including the window through the image analysis, and based on this, the computing device may identify the propagation characteristics of the radio signal.

As denoted by identification numbers 1310 to 1330, the window may be analyzed, and the detailed structure thereof may be analyzed. The detailed structure may include an object made of another material of the window, and as an example, it may include the structure, such as a window frame. In accordance with the detailed structure, the radio signal incoming on the window may be lost, diffracted, or reflected. In an embodiment, identification of the detailed structure of the window may be performed through the image analysis. More specifically, the detailed structure of the window may include determination of at least one of a window frame direction, width, material, and the number of window frames through the image analysis. As described above, by determining and embodying the detailed structure of the window, the detailed structure of the window may be digitized and reflected in the simulation result in consideration of the radio wave incoming structure. More specifically, in accordance with the detailed structure, a numeral related to at least one of reflection, penetration, and diffraction may be determined, and based on this, the indoor propagation of the radio signal through the radio wave incoming structure may be simulated.

The identification number 1350 indicates a propagation loss in accordance with the width of a lattice, and as the width of the lattice is increased, the loss is increased. That is, the degree of loss may differ depending on the number of lattices.

The identification number 1360 indicates the degree of radio wave diffraction in accordance with the thickness of the lattice, and as the thickness of the lattice is decreased, the diffraction is increased. That is, the degree of the diffraction may differ depending on the number of lattices.

As described above, by analyzing the detailed structure of the window, the propagation characteristics of the radio signal may be well analyzed.

Figure 14:
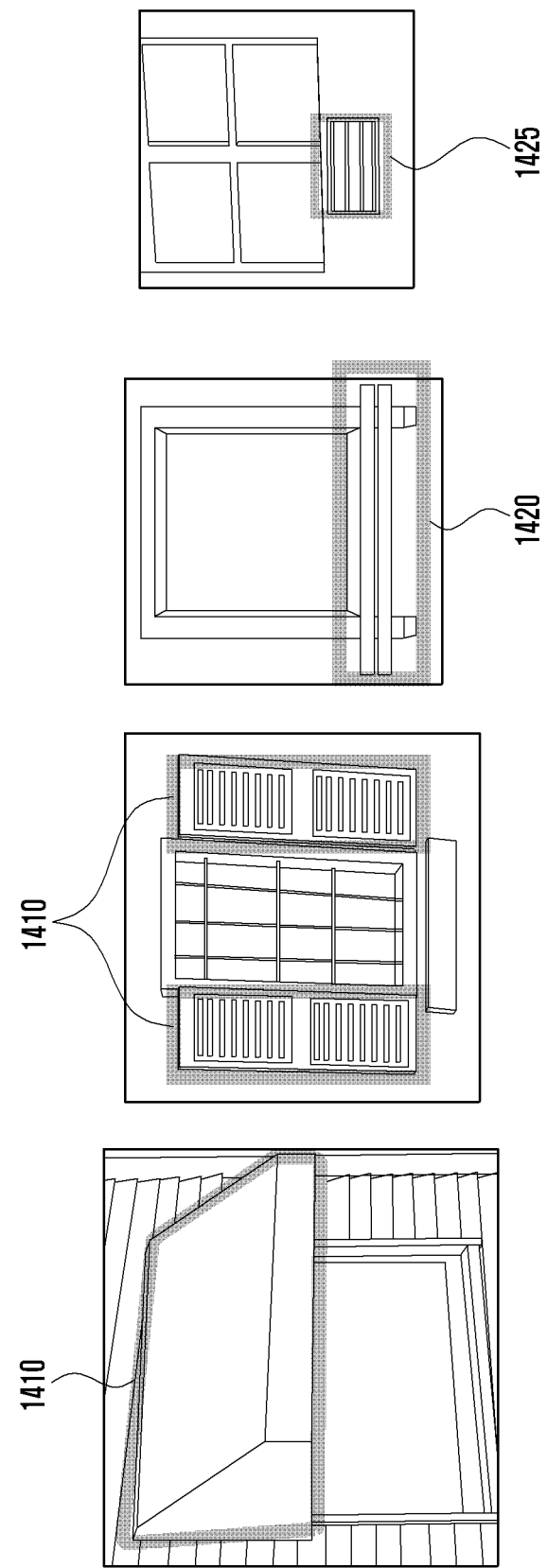
FIG. 14 is a diagram explaining kinds of objects adjacent to a radio wave incoming structure located on a structure.

FIG. 14 is a diagram explaining kinds of objects adjacent to a radio wave incoming structure located on a structure.

With reference to FIG. 14, the computing device may identify the object adjacent to the radio wave incoming structure, such as the window through the image analysis, and it may perform the simulation in consideration of the influence exerted by the object on the radio signal propagation.

As illustrated, in the case of an installation 1425 that is adjacent to the window, such as an eave structure 1410, cover structure 1415, shelf structure 1420, and outdoor unit, it may exert an influence on at least one of reflection, diffraction, and penetration of the radio signal. In the case of a structure that may exert an influence on at least one of the reflection, diffraction, and penetration of the radio signal as described above in addition to the illustrated structure, it is possible to simulate the indoor radio signal propagation through the radio wave incoming structure in consideration of at least one of the size, shape, and distance from the window through the image analysis.

Figure 15:
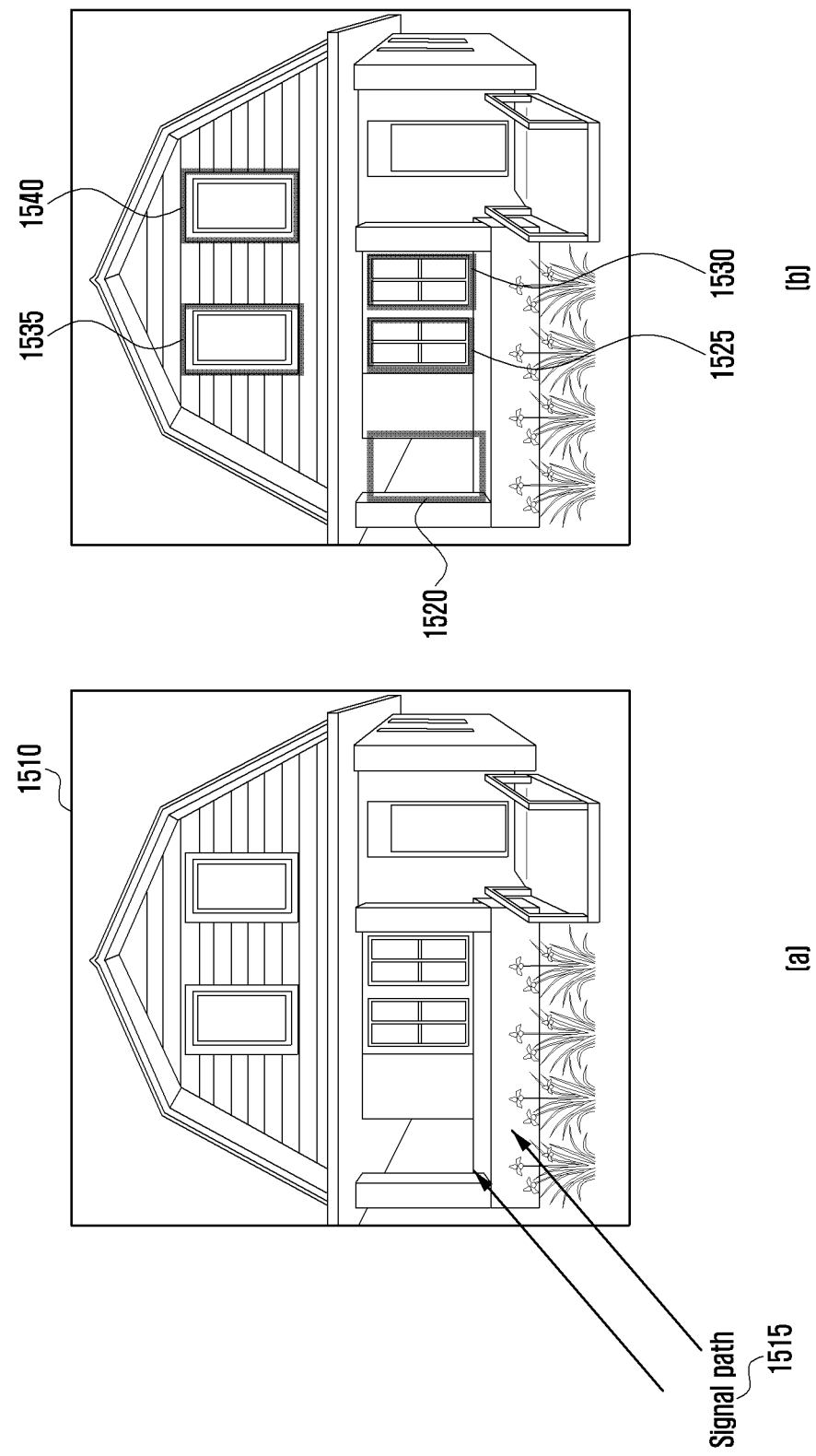
FIG. 15 is a diagram explaining a method for installing an auxiliary object for transferring radio waves in accordance with a radio wave incoming structure of a structure and a signal path.

FIG. 15 is a diagram explaining a method for installing an auxiliary object for transferring radio waves in accordance with a radio wave incoming structure of a structure and a signal path.

With reference to FIG. 15, a path 1515 for transmitting the radio signal may be identified, and based on this, the incoming structure may be identified. More specifically, the radio wave incoming structure may be analyzed based on an image of identification number 1510. Accordingly, the radio wave incoming structures of identification numbers 1520 to 1540 may be identified, and it is possible to simulate how the radio signal is propagated indoors in consideration of the size and the material of the radio wave incoming structure, the detailed structure of the radio wave incoming structure, and an adjacent object.

In this case, the physical value may be digitized and reflected in the 3D model based on the information analyzed in the previous embodiment, and based on this, the simulation may be performed. Based on this, it is possible to determine the aspect of the indoor radio signal transmission, and if the quality of the radio signal for indoor communication is not proper, the corresponding resultant value may be derived, and based on this, information for configuring a device for assisting the radio signal propagation may be determined. The details thereof will be described later.

Figure 16:
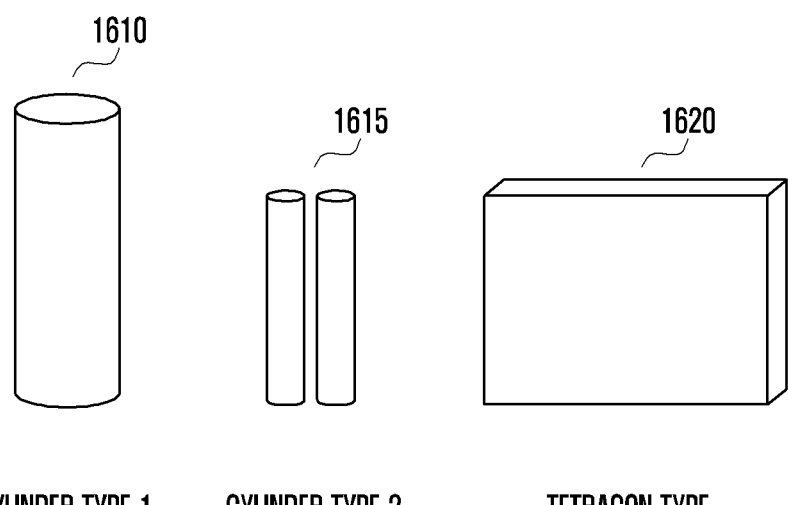
FIG. 16 is a diagram explaining an auxiliary object for transferring a radio signal.

FIG. 16 is a diagram explaining an auxiliary object for transferring a radio signal.

With reference to FIG. 16, auxiliary objects for transferring the radio signal are illustrated. More specifically, by installing the illustrated auxiliary object adjacent to the radio wave incoming structure, the radio signal can be well propagated indoors. The auxiliary object as described above may reflect and diffract the radio signal. In an embodiment, the material of the auxiliary object may be selected suitable to the radio wave reflection and diffraction, and according to an embodiment, a specific pattern may be formed to perform the diffraction and the reflection in a wider direction. In this case, the size of the pattern may be determined based on the frequency of the used radio waves. More specifically, the pattern may include a grooved structure at constant intervals or a repeated irregular structure. Through inclusion of such a pattern, the diffraction and the reflection may be performed more easily.

Further, the auxiliary object may be installed adjacent to the radio wave incoming structure, and the installation direction of the auxiliary object may be determined in consideration of at least one of the signal transmission direction and the location of an area at which the radio signal does not arrive.

Further, the auxiliary object may include a cylinder shape 1610, two cylinder shapes 1615, and a tetragon shape 1620, but the shape of the auxiliary object is not limited thereto. By installing the auxiliary object, the radio signal can more easily be transferred indoors.

Figure 17:
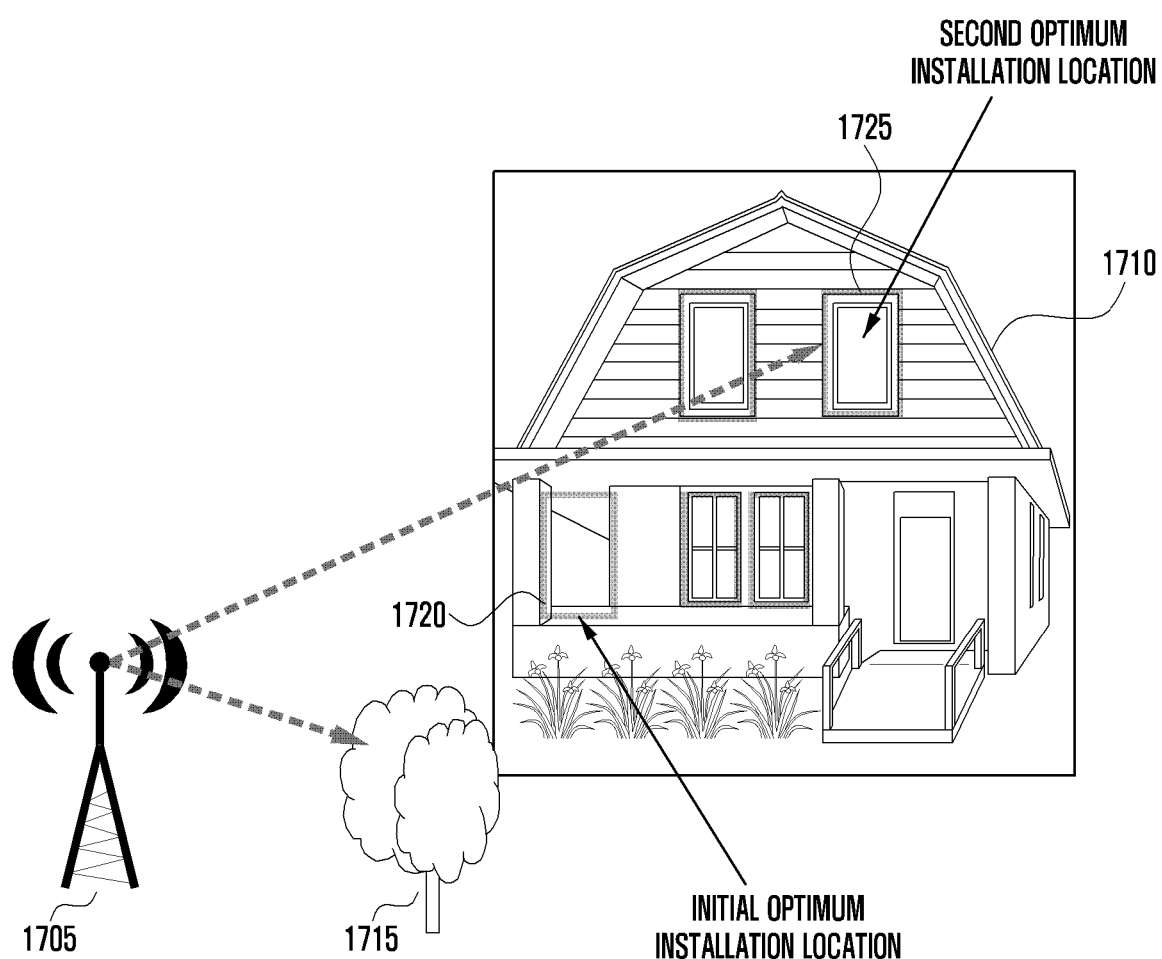
FIG. 17 is a diagram explaining installation of an auxiliary object for transferring radio waves in accordance with a network operation situation according to an embodiment of the disclosure.

FIG. 17 is a diagram explaining installation of an auxiliary object for transferring radio waves in accordance with a network operation situation according to an embodiment of the disclosure.

With reference to FIG. 17, a method is illustrated, in which an auxiliary object for transferring radio waves is installed in accordance with a network operation situation, and the network operation is performed based on the installed object.

A transmitter 1705 may transmit a signal toward a building 1710. In this case, an object that may hinder the radio wave penetration, such as a tree 1715, may be located between the transmitter 1705 and the building 1710. By initially analyzing the propagation aspect of the radio signal, the installation location of the auxiliary object for propagating the radio signal may be determined within the building. As an example, an initial optimum installation location 1720 may be configured, and accordingly, the auxiliary object may be installed.

Thereafter, if the tree 1715 grows or the location of the tree 1715 is changed, the auxiliary object may be additionally installed at the second optimum location 1725 excluding the initial optimum installation location 1720. The second optimum location 1725 may be determined in accordance with the initial simulation, and according an embodiment, the auxiliary object may be installed in additional consideration of the growth of the tree 1715 or the change location of the tree 1715.

Further, in an embodiment, the transmitter 1705 may transmit the signal in consideration of the installation location 1720 and 1725 of the auxiliary object. More specifically, the signal may be transmitted by selecting the beam suitable to at least one of diffraction and reflection in accordance with the installed auxiliary object. More specifically, the frequency of the corresponding beam and the beam direction may be changed and transmitted in accordance with the location and the characteristics of the installed auxiliary object.

Figure 18:
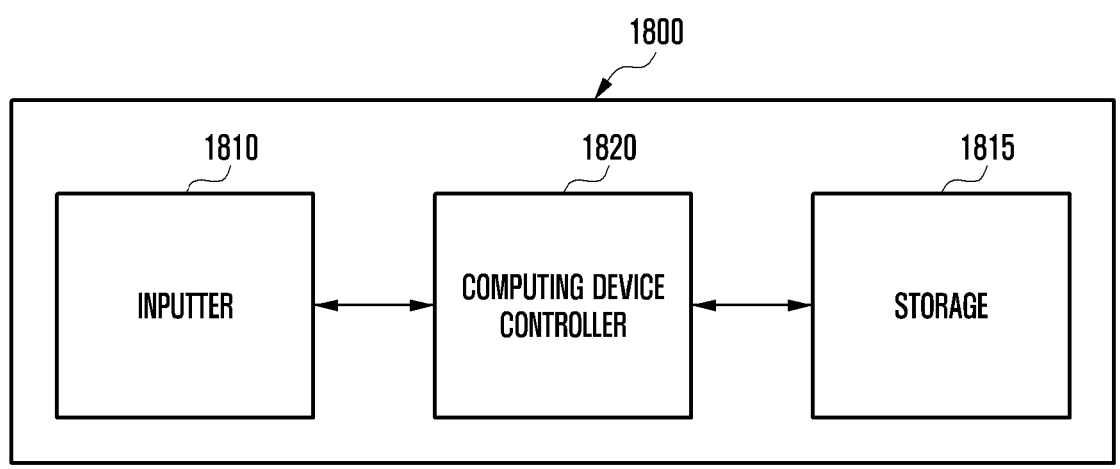
FIG. 18 is a diagram explaining a computing device according to an embodiment of the disclosure.

FIG. 18 is a diagram explaining a computing device according to an embodiment of the disclosure.

FIG. 18 illustrates a computing device according to an embodiment of the disclosure.

With reference to FIG. 18, a computing device 1800 according to an embodiment includes an inputter 1810, a storage 1815, and a controller 1820.

The transceiver 1810 may transmit and receive a signal to and from a device outside the computing device 1800. More specifically, the transceiver 1810 may transmit and receive data to and from an external device, and the transceiver 1810 may include an interface for this.

The storage 1815 may store at least one of information related to the computing device 1800 and information transmitted and received through the transceiver 1810. Further, the storage 1815 may store the whole information required for the simulation in an embodiment of the disclosure, such as information according to the simulation result, information on the object surface material and the external shape according to the image analysis, 3D map information, and information on the mapped object surface material and the external shape. Further, the storage 1815 may store information related to the radio wave incoming structure according to an embodiment. Further, the information stored in the storage 1815 may be added, deleted, or updated based on at least one of the simulation result and the comparison result.

The controller 1820 may control the operation of the computing device 1800, and it may control the overall operation of the computing device so as to perform the operation related to the computing device as described above in the above-described embodiment. The controller 1820 may include at least one processor. Further, the processor may be controlled by a program including instructions for executing the above-described method according to an embodiment of the disclosure. Further, the program may be stored in a storage medium, and the storage medium may include a volatile or nonvolatile memory. The memory may be a medium capable of storing data, and in the case of storing the instructions, the shape thereof is not limited.

Figure 19:
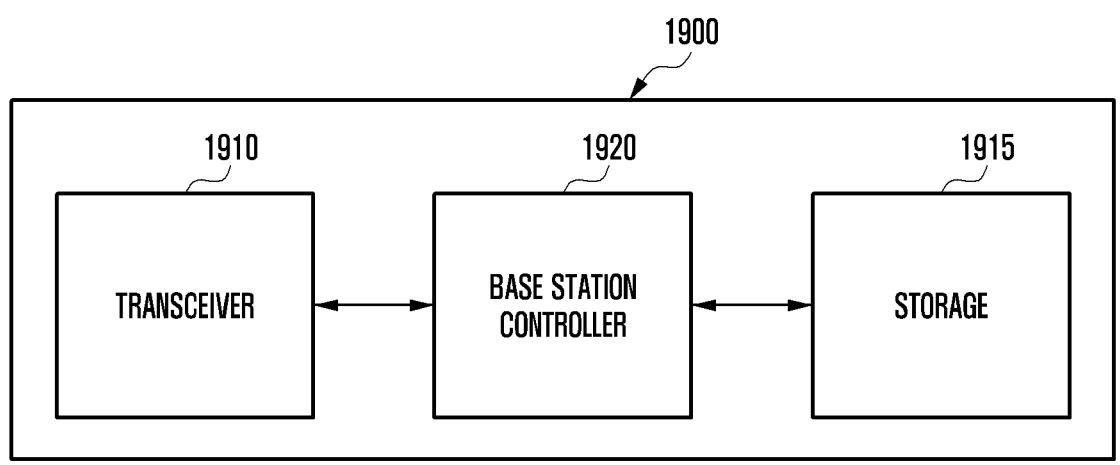
FIG. 19 is a diagram explaining a base station according to an embodiment of the disclosure.

FIG. 19 is a diagram explaining a base station according to an embodiment of the disclosure.

With reference to FIG. 19, a base station 1900 according to an embodiment includes a transceiver 1910, a storage 1915, and a controller 1920.

The transceiver 1910 may transmit and receive a signal to and from a terminal and another network entity.

The storage 1915 may store at least one of information related to the base station 1900 and information transmitted and received through the transceiver 1910. Further, the storage 1915 may store at least one piece of information of the simulation result and the installation location of the auxiliary object for transferring the radio signal. In an embodiment, the configuration of the storage 1915 is not essential.

The controller 1920 may control the operation of the base station 1900, and it may control the overall operation of the base station so as to perform the operation related to the base station as described above in the above-described embodiment. The controller 1820 may include at least one processor.

Meanwhile, preferred embodiments of the disclosure disclosed in this specification and drawings and specific terms used therein are illustrated to present only specific examples in order to clarify the technical contents of the disclosure and help understanding of the disclosure, but are not intended to limit the scope of the disclosure. It will be evident to those skilled in the art that various modifications based on the technical spirit of the disclosure are possible in addition to the disclosed embodiments.

The invention claimed is:

1. A method for identifying radio signal transmission characteristics in a wireless communication system, the method comprising:
   identifying, by a controller, a signal transmission location;
   identifying, by the controller, a two-dimensional (2D) image information related to a structure;
   identifying, by the controller, based on the 2D image information, at least one radio wave incoming structure located on the structure; and
   identifying, by the controller, based on information on the at least one radio wave incoming structure, transmission characteristics of a radio signal transmitted from the signal transmission location.

2. The method of claim 1, wherein identifying, by the controller, the transmission characteristics of the radio signal comprises identifying, by the controller, the transmission characteristics of the radio signal transmitted from the signal transmission location inside the structure.

3. The method of claim 1, wherein identifying, by the controller, the radio wave incoming structure comprises identifying, by the controller, at least one of size information of the radio wave incoming structure or material information of the radio wave incoming structure.

4. The method of claim 1,
   wherein the radio wave incoming structure includes a window, and an object located on the radio wave incoming structure includes a window frame of the window, and
   wherein identifying, by the controller, the radio wave incoming structure comprises identifying, by the controller, at least one of the number of window frames, a deployment direction of the window frame, or a width of the window frame.

5. The method of claim 1, further comprising identifying, by the controller, an object adjacent to the radio wave incoming structure, wherein the transmission characteristics of the radio signal are identified based on the object adjacent to the radio wave incoming structure.

6. The method of claim 1,
wherein identifying, by the controller, the at least one radio wave incoming structure includes:
identifying, by the controller, an additional radio wave incoming structure based on a deployment of the one or more identified radio wave incoming structures.

7. The method of claim 1, further comprising identifying, by the controller, a location for installing an object for assisting radio signal transmission based on the information on the at least one radio wave incoming structure and the identified transmission characteristics of the radio signal,
wherein a shape of the object for assisting the radio signal transmission is determined based on a frequency of the radio signal and the signal transmission location, and
wherein the structure is identified based on 3D map information, and the radio wave incoming structure is identified based on image information corresponding to the 3D map information.

8. A computing device for analyzing signal transmission characteristics in a wireless communication system, the computing device comprising:
a transceiver configured to transmit and receive information; and
a controller configured to:
identify a signal transmission location,
identify two-dimensional (2D) image information related to a structure,
identify, based on the 2D image information, at least one radio wave incoming structure located on the structure, and
identify, based on information on the at least one radio wave incoming structure, transmission characteristics of a radio signal transmitted from the signal transmission location.

9. The computing device of claim 8, wherein the controller is configured to identify the transmission characteristics of the radio signal transmitted from the signal transmission location inside the structure.

10. The computing device of claim 8, wherein the controller is configured to identify at least one of size information of the radio wave incoming structure or material information of the radio wave incoming structure.

11. The computing device of claim 8,
wherein the radio wave incoming structure includes a window, and an object located on the radio wave incoming structure includes a window frame of the window, and
wherein the controller is configured to identify at least one of the number of window frames, a deployment direction of the window frame, or a width of the window frame.

12. The computing device of claim 8,
wherein the controller is configured to identify an object adjacent to the radio wave incoming structure, and
wherein the transmission characteristics of the radio signal are identified based on the object adjacent to the radio wave incoming structure.

13. The computing device of claim 8, wherein the controller is configured to:
identify image information of the structure, and one or more radio wave incoming structures based on the image information, and
identify an additional radio wave incoming structure based on a deployment of the one or more identified radio wave incoming structures.

14. The computing device of claim 8,
wherein the controller is configured to identify a location for installing an object for assisting radio signal transmission based on the information on the at least one radio wave incoming structure and the identified transmission characteristics of the radio signal, and
wherein a shape of the object for assisting the radio signal transmission is determined based on a frequency of the radio signal and the signal transmission location.

15. The computing device of claim 8, wherein the structure is identified based on 3D map information, and the radio wave incoming structure is identified based on image information corresponding to the 3D map information.

16. The method of claim 1, further comprising:
identifying, by the controller, based on the 2D image information, a layout pattern of a plurality of radio wave incoming structures within the structure; and
determining, by the controller, based on the 2D image information, whether one of the radio wave incoming structures is omitted from the layout pattern.

17. The method of claim 16, further comprising:
in case that one of the radio wave incoming structures is omitted from the layout pattern, interpolating a location of a first radio wave incoming structure.

* * * * *